United States Patent
Kondo et al.

(10) Patent No.: US 12,384,675 B2
(45) Date of Patent: Aug. 12, 2025

(54) HYDROGEN STORAGE AND RELEASE MATERIAL AND METHOD OF PRODUCING SAME

(71) Applicants: University of Tsukuba, Tsukuba (JP); Tokyo Institute of Technology, Tokyo (JP)

(72) Inventors: Takahiro Kondo, Tsukuba (JP); Ryota Ishibiki, Tsukuba (JP); Taiga Goto, Tsukuba (JP); Shin-Ichi Ito, Tokyo (JP); Yoshihiro Kinoshita, Tsukuba (JP)

(73) Assignees: University of Tsukba, Tsukuba (JP); Institute of Science Tokyo, Tokyo (JP)

( * ) Notice: Subject to any disclaimer, the term of this patent is extended or adjusted under 35 U.S.C. 154(b) by 646 days.

(21) Appl. No.: 17/776,470

(22) PCT Filed: Nov. 6, 2020

(86) PCT No.: PCT/JP2020/041443
§ 371 (c)(1),
(2) Date: May 12, 2022

(87) PCT Pub. No.: WO2021/100481
PCT Pub. Date: May 27, 2021

(65) Prior Publication Data
US 2022/0402756 A1 Dec. 22, 2022

(30) Foreign Application Priority Data
Nov. 18, 2019 (JP) .................................. 2019-207861

(51) Int. Cl.
*C01B 3/00* (2006.01)
*C01B 6/10* (2006.01)

(52) U.S. Cl.
CPC .............. *C01B 3/0084* (2013.01); *C01B 6/10* (2013.01)

(58) Field of Classification Search
CPC ....... C01B 3/0084; C01B 6/10; C01B 35/026; C01B 3/001; Y02E 60/32; Y02E 60/36
See application file for complete search history.

(56) References Cited

U.S. PATENT DOCUMENTS

| 5,709,791 A | 1/1998 | Hibino et al. |
| 7,166,150 B2 | 1/2007 | Torgersen et al. |

(Continued)

FOREIGN PATENT DOCUMENTS

| CN | 101090861 A | 12/2007 |
| CN | 101184689 A | 5/2008 |

(Continued)

OTHER PUBLICATIONS

Chinese Office Action and Search Report issued in corresponding Chinese Application No. 202080078697.8, dated Aug. 12, 2023.

(Continued)

*Primary Examiner* — Anthony J Zimmer
*Assistant Examiner* — Syed T Iqbal
(74) *Attorney, Agent, or Firm* — Blank Rome LLP (57) ABSTRACT

The present invention provides a hydrogen storage and release material including a two-dimensional hydrogen boride-containing sheet including a two-dimensional network containing $n(H_xB_y)$ ($n\geq 4$, $0.001\leq x/y\leq 0.999$) having a molar ratio of boron to hydrogen from 1:0.999 to 1:0.001, the molar ratio being determined by thermal desorption spectroscopy, and mass measurement before and after a temperature rise, wherein the hydrogen storage and release material has: peaks derived from B1s of boron at 187.5±1.0 eV and 191.2±1.0 eV to 193±1.0 eV in X-ray photoelectron spectroscopy, and a peak derived from a B—H stretching (Continued)

vibration at from 2400 cm$^{-1}$ to 2600 cm$^{-1}$ and also a peak derived from a B—H—B stretching vibration at from 1200 cm$^{-1}$ to 1800 cm$^{-1}$ in infrared spectroscopy.

7 Claims, 7 Drawing Sheets

(56) References Cited

U.S. PATENT DOCUMENTS

| | | | |
|---|---|---|---|
| 2002/0083643 A1 | 7/2002 | Amendola et al. | |
| 2006/0088467 A1 | 4/2006 | Torgersen et al. | |
| 2015/0166336 A1 | 6/2015 | Fisher et al. | |
| 2019/0315628 A1* | 10/2019 | Kondo | C01B 35/026 |

FOREIGN PATENT DOCUMENTS

| | | | |
|---|---|---|---|
| CN | 104477842 A | 4/2015 | |
| EP | 3514114 A1 | 7/2019 | |
| JP | 08-301606 A | 11/1996 | |
| JP | 09-67689 A | 3/1997 | |
| JP | 10-121266 A | 5/1998 | |
| JP | 2009-195903 A | 9/2009 | |
| WO | WO-2018074518 A1 * | 4/2018 | C01B 35/026 |

OTHER PUBLICATIONS

European Search Report issued in corresponding EP Application No. 20888753.9, dated Nov. 24, 2023.
A. Fujino et al., "Hydrogenated Borophene Shows Catalytic Activity as Solid Acid", ACS Omega, vol. 4, No. 9, Aug. 15, 2019, pp. 14100-14104.
H. Nishino et al. "Formation and Characterization of Hydrogen Boride Sheets Derived from M$_g$B$_2$ by Cation Exchange", J. Am. Chem. Soc., vol. 139, pp. 13761-13769, 2017.
T. Kondo et al., "Generation of Borophane, New Two-Dimensional Materials Composed of Hydrogen and Boron", JXTG Technical Review, vol. 60, No. 2, pp. 9-13, 2018.
Int'l Search Report, PCT/JP2020/041443, w/ English trans., May 27, 2021.
Int'l Prelim Report on Patentability, PCT/JP2020/041443, w/ English trans., Mar. 15, 2022.
Notice of Allowance issued in corresponding JP Application No. 2021-558284 dated Nov. 19, 2024.

* cited by examiner

FIG. 7

HYDROGEN STORAGE AND RELEASE MATERIAL AND METHOD OF PRODUCING SAME

BACKGROUND OF THE INVENTION

Technical Field

The present invention relates to a hydrogen storage and release material and a method of producing the same.

Background Art

As methods for generating hydrogen or oxygen from water, electrolysis of water (see, for example, JP H09-67689 A) and a method using a photocatalyst (for example, see JP H10-121266 A) are typically known.

SUMMARY OF THE INVENTION

Technical Problem

However, in the methods described in JP H09-67689 A and JP H10-121266 A, hydrogen and oxygen produced by breakdown of water are generated simultaneously, and thus there is a danger that hydrogen will explode. Therefore, in the methods described in Patent Documents 1 and 2, hydrogen and oxygen need to be recovered separately and at different timings.

The present invention has been made in view of the above circumstances, and an object of the present invention is to provide a hydrogen storage and release material that can generate hydrogen and oxygen separately at different timings, that is, can store hydrogen from water and release the stored hydrogen at a timing different from oxygen release, and a method of producing the same.

Solution to Problem

[1] A hydrogen storage and release material including a two-dimensional hydrogen boride-containing sheet including a two-dimensional network containing $n(H_xB_y)$ ($n \geq 4$, $0.001 \leq x/y \leq 0.999$) having a molar ratio of boron to hydrogen from 1:0.999 to 1:0.001, the molar ratio being determined by thermal desorption spectroscopy, and mass measurement before and after a temperature rise,
  wherein the hydrogen storage and release material has:
  peaks derived from B1s of boron at 187.5±1.0 eV and 191.2±1.0 eV to 193±1.0 eV in X-ray photoelectron spectroscopy, and
  a peak derived from a B—H stretching vibration at from 2400 cm$^{-1}$ to 2600 cm$^{-1}$ and also a peak derived from a B—H—B stretching vibration at from 1200 cm$^{-1}$ to 1800 cm$^{-1}$ in infrared spectroscopy.

[2] The hydrogen storage and release material according to [1], wherein the two-dimensional hydrogen boride-containing sheet has a mesh-shaped planar structure in which boron atoms are arranged in a cyclic hexagon, and a plurality of the hexagons formed by the boron atoms are connected to each other, and
  hydrogen atoms are randomly bonded to the boron atoms forming the plurality of the hexagons, without having specific periodic regularity and without aggregating.

[3] The hydrogen storage and release material according to [1] or [2], wherein the two-dimensional hydrogen boride-containing sheet has a length of 100 nm or more in at least one direction.

[4] A method of producing the hydrogen storage and release material described in any one of [1] to [3], including:
  mixing, in a polar organic solvent, magnesium diboride having an MgB$_2$ type structure and an ion exchange resin to which an ion that is ion-exchangeable with a magnesium ion constituting the magnesium diboride is coordinated, thereby forming a hydrogen storage and release material precursor; and
  heat-treating the hydrogen storage and release material precursor at from 110° C. to 450° C.

[5] The method of producing the hydrogen storage and release material according to [4],
  wherein the hydrogen storage and release material precursor has:
  a two-dimensional network containing $(HB)_n$ ($n \geq 4$) having a molar ratio of boron to hydrogen at 1:1, the molar ratio being determined by thermal desorption spectroscopy, and mass measurement before and after a temperature rise, and
  a spectrum showing a peak derived from B1s of negatively charged boron at 188 eV±1.0 eV in X-ray photoelectron spectroscopy, and showing a peak derived from an sp$^2$ structure of boron at 191 eV±1.0 eV in electron energy loss spectroscopy.

[6] The method of producing the hydrogen storage and release material according to [4] or [5], wherein the hydrogen storage and release material precursor has a mesh shape in which boron atoms are arranged in a cyclic hexagon, and a plurality of hexagons formed by the boron atoms are connected to each other, and includes a two-dimensional network having a site where two adjacent boron atoms, among the boron atoms, are bonded to the same hydrogen atom.

[7] The method of producing the hydrogen storage and release material according to any one of [4] to [6], wherein the ion exchange resin has a sulfo group.

[8] The method of producing the hydrogen storage and release material according to any one of [4] to [7], wherein the polar organic solvent is acetonitrile.

Advantageous Effects of Invention

The present invention can provide a hydrogen storage and release material that can separately generate hydrogen and oxygen produced by breakdown of water, that is, a hydrogen storage and release material that can store hydrogen from water and release the stored hydrogen at a timing different from oxygen release. And the present invention provides a method of producing the same.

DETAILED DESCRIPTION OF THE EMBODIMENTS

Embodiments of the hydrogen storage and release material and the method of producing the same of the present invention will be described.

The embodiments are specifically described in order to better understand the invention, and do not limit the present invention unless otherwise specified.

Hydrogen Storage and Release Material

The hydrogen storage and release material of the present embodiment is constituted by a two-dimensional hydrogen boride-containing sheet including a two-dimensional network containing $n(H_xB_y)$ ($n \geq 4$, $0.001 \leq x/y \leq 0.999$) having a molar ratio of boron to hydrogen from 1:0.999 to 1:0.001. That is, the hydrogen storage and release material of the present embodiment is a sheet-shaped material constituted by a two-dimensional hydrogen boride-containing sheet including a two-dimensional network containing boron atoms (B) and hydrogen atoms (H), in which these two atoms are present in a molar ratio from 1:0.999 to 1:0.001.

In the hydrogen storage and release material of the present embodiment, the ratio (molar ratio) of boron atoms (B) to hydrogen atoms (H) is determined by thermal desorption spectroscopy, and mass measurement before and after a temperature rise, which will be described later.

Also, the two-dimensional hydrogen boride-containing sheet constituting the hydrogen storage and release material of the present embodiment shows peaks derived from B1s of boron at from 187.5±1.0 eV and 191.2±1.0 eV to 193±1.0 eV in X-ray photoelectron spectroscopy.

In the hydrogen storage and release material of the present embodiment, X-ray photoelectron spectroscopy will be described below.

Also, the two-dimensional hydrogen boride-containing sheet that constitutes the hydrogen storage and release material of the present embodiment has a peak derived from a B—H stretching vibration at from 2400 $cm^{-1}$ to 2600 $cm^{-1}$ and also a peak derived from a B—H—B stretching vibration at from 1200 $cm^{-1}$ to 1800 $cm^{-1}$ in infrared spectroscopy.

That is, the two-dimensional hydrogen boride-containing sheet constituting the hydrogen storage and release material of the present embodiment has not only a B—H bond, but also has a B—H—B bond.

In the hydrogen storage and release material of the present embodiment, infrared spectroscopy will be described below.

Figure 1:
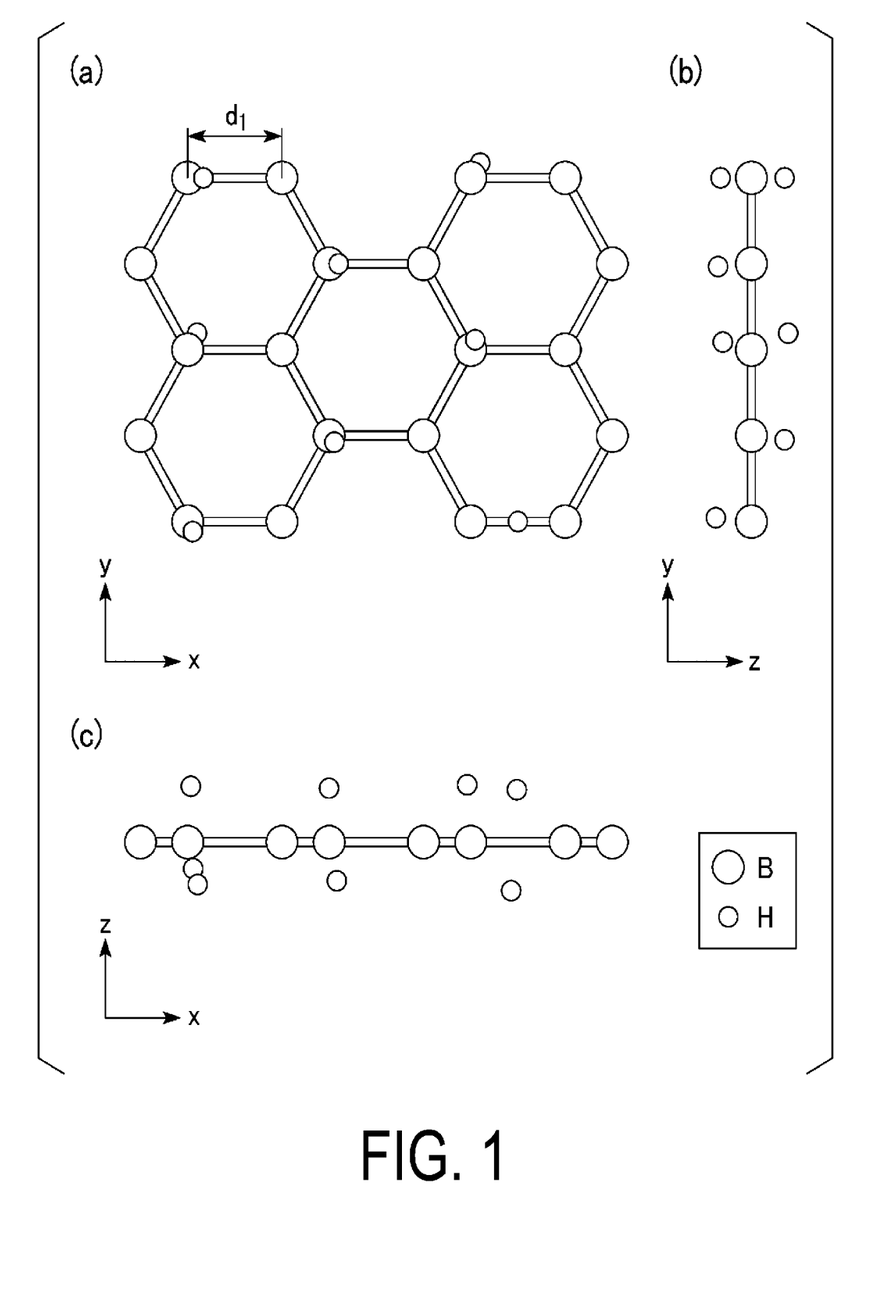
FIG. 1 is a schematic view illustrating a molecular structure of a two-dimensional boron-containing sheet constituting a hydrogen storage and release material according to an embodiment of the present invention. (a) is a view illustrating an XY plane, (b) is a view illustrating a YZ plane, and (c) is a view illustrating a ZX plane.

In the two-dimensional hydrogen boride-containing sheet constituting the hydrogen storage and release material of the present embodiment, boron atoms (B) are arranged in a hexagon like a benzene ring and are present at vertices of the hexagon, and a plurality of the hexagons formed by the boron atoms (B) are connected to each other to form a mesh-shaped planar structure (two-dimensional network), as illustrated in FIG. 1. Furthermore, as illustrated in FIG. 1, in the two-dimensional hydrogen boride-containing sheet in the present embodiment, hydrogen atoms (H) are randomly bonded to the boron atoms (B) forming the plurality of the hexagons, without having specific periodic regularity and without aggregating. Therefore, the sheet has a structure in which the bonds between the atoms are inclined or the sheet itself bends in the z-direction of FIG. 1.

In the two-dimensional hydrogen boride-containing sheet in the present embodiment, the hexagonal mesh shape formed by boron atoms (B) is, for example, referred to as honeycomb shape.

The hydrogen storage and release material of the present embodiment is a thin film-shaped material having a two-dimensional network containing boron atoms (B) and hydrogen atoms (H). In addition, the hydrogen storage and release material of the present embodiment contains almost no magnesium derived from magnesium diboride used in the method of producing the hydrogen storage and release material of the present embodiment which will be described below, or other metal atoms.

In the hydrogen storage and release material of the present embodiment, a total number of the boron atoms (B) and hydrogen atoms (H) that form the mesh-shaped planar structure of the two-dimensional hydrogen boride-containing sheet is 1000 or more.

A bonding distance $d_1$ between two adjacent boron atoms (B) illustrated in FIG. 1(*a*) is from 0.155 nm to 0.190 nm.

A thickness of the hydrogen storage and release material of the present embodiment is from 0.2 nm to 10 nm.

The two-dimensional hydrogen boride-containing sheet constituting the hydrogen storage and release material of the present embodiment preferably has a length of 100 nm or more in at least one direction (e.g., a length in the X-direction or the Y-direction in FIG. 1(*a*)). In the hydrogen storage and release material of the present embodiment, when the length in at least one direction of the two-dimensional hydrogen boride-containing sheet is 100 nm or more, the hydrogen storage and release material of the present embodiment can be effectively utilized as a hydrogen storage and release material.

A size (area) of the hydrogen storage and release material of the present embodiment is not particularly limited, and the hydrogen storage and release material can be formed in any size by the method of producing the hydrogen storage and release material of the present embodiment which will be described below.

The two-dimensional hydrogen boride-containing sheet constituting the hydrogen storage and release material of the present embodiment may be terminated with an oxide, nitride, or carbide. That is, in the hydrogen storage and release material in the present embodiment, an oxide, nitride, and carbide may form a terminal end of the molecular structure. Examples of oxides, nitrides and carbides forming the terminal of the molecular structure of the two-dimensional hydrogen boride-containing sheet in the present embodiment include boric acid ($B(OH)_3$), boron oxide ($B_2O_3$), a hydroxy group (OH), boron nitride (BN), and boron carbide (BC). The two-dimensional hydrogen boride-containing sheet constituting the hydrogen storage and release material of the present embodiment is terminated with an oxide, nitride, or carbide, thereby forming a more stable molecular structure.

The two-dimensional hydrogen boride-containing sheet constituting the hydrogen storage and release material of the present embodiment has a strong bonding force between: the boron atoms (B) forming the hexagonal ring; and the boron atoms (B) and the hydrogen atoms (H). Therefore, even though the two-dimensional hydrogen boride-containing sheet in the present embodiment forms a plurality of stacked layers of crystal (aggregate) at the time of production, the crystal layers can be easily cleaved along the crystal plane, similarly to graphite, and separated (recovered) as single-layer two-dimensional sheets.

The hydrogen storage and release material of the present embodiment is constituted by a two-dimensional hydrogen boride-containing sheet having a two-dimensional network including $n(H_xB_y)$ ($n \geq 4$, $0.001 \leq x/y \leq 0.999$) having a molar ratio of boron to hydrogen from 1:0.999 to 1:0.001, the molar ratio determined by thermal desorption spectroscopy, and mass measurement before and after a temperature rise. Further, the two-dimensional hydrogen boride-containing sheet has peaks derived from B1s of boron at $187.5 \pm 1.0$ eV and $191.2 \pm 1.0$ eV to $193 \pm 1.0$ eV in X-ray photoelectron spectroscopy, and a peak derived from a B—H stretching vibration at from 2400 $cm^{-1}$ to 2600 $cm^{-1}$ and also a peak derived from a B—H—B stretching vibration at from 1200 $cm^{-1}$ to 1800 $cm^{-1}$ in infrared spectroscopy. Thus, the hydrogen storage and release material can store hydrogen from water and release the stored hydrogen, without generating hydrogen and oxygen at the same time. In addition, the hydrogen storage and release material of the present embodiment enables storage and release of hydrogen reversibly. When the hydrogen storage and release material of the present embodiment stores hydrogen from water, almost only oxygen gas is released. When the hydrogen storage and release material of the present embodiment releases the stored hydrogen, almost only hydrogen gas is released. Therefore, the hydrogen storage and release material of the present embodiment has a low risk of hydrogen explosion, and does not require an operation of separating hydrogen and oxygen from each other. Furthermore, the hydrogen storage and release material of the present embodiment, when storing or releasing hydrogen, does not generate carbon dioxide.

Method of Producing Hydrogen Storage and Release Material

The method of producing the hydrogen storage and release material of the present embodiment includes:

mixing magnesium diboride having an $MgB_2$ type structure and an ion exchange resin to which ions that are ion-exchangeable with magnesium ions constituting the magnesium diboride are coordinated in a polar organic solvent to form a hydrogen storage and release material precursor (hereinafter referred to as "first step"); and heat-treating the hydrogen storage and release material precursor at from 120° C. to 450° C. (hereinafter referred to as "second step").

In the method of producing the hydrogen storage and release material of the present embodiment, magnesium diboride having an $MgB_2$ type structure and an ion exchange resin to which ions that are ion-exchangeable with magnesium ions constituting the magnesium diboride are coordinated are mixed in a polar organic solvent to form a hydrogen storage and release material precursor (first step).

The ion exchange resin to which ions that are ion-exchangeable with magnesium ions constituting the magnesium diboride are coordinated is not particularly limited, and examples thereof include a polymer of styrene having a functional group (hereinafter referred to as "functional α") to which ions that are ion-exchangeable with magnesium ions constituting the magnesium diboride are coordinated, a polymer of divinylbenzene having the functional group α, and a copolymer of styrene having the functional group α and divinylbenzene having the functional group α.

Examples of the functional group α include sulfo groups and carboxyl groups. Among these groups, a sulfo group is preferred since it can easily undergo ion exchange with magnesium ions constituting the magnesium diboride in the polar organic solvent.

The polar organic solvent is not particularly limited, and examples thereof include acetonitrile, N,N-dimethylformamide and methanol. Among these, acetonitrile is preferred since it does not contain oxygen.

Note that the magnesium diboride can easily undergo ion exchange with the ion exchange resin in the polar organic solvent.

In the first step, magnesium diboride and an ion exchange resin are added to a polar organic solvent, and a mixed solution containing the polar organic solvent, the magnesium diboride and the ion exchange resin is stirred to bring the magnesium diboride and the ion exchange resin into contact with each other sufficiently. Thus, magnesium ions constituting the magnesium diboride and ions of the functional group α of the ion exchange resin undergo ion-exchange to produce a sheet-shaped hydrogen storage and release material precursor having a two-dimensional network formed by boron atoms and atoms derived from the functional group α of the ion exchange resin.

When an ion exchange resin having a sulfo group as the ion exchange resin is used, the magnesium ions ($Mg^{2+}$) of magnesium diboride are replaced by the hydrogen ions (W) of the sulfo group of the ion exchange resin, and a sheet-shaped hydrogen storage and release material precursor having a two-dimensional network containing boron atoms (B) and hydrogen atoms (H) as described above is produced.

In the first step, it is preferable to gently proceed with an ion exchange reaction between the magnesium ions constituting the magnesium diboride and the ions of the functional group α of the ion exchange resin without applying ultrasonic waves or the like to the mixed solution.

When the mixed solution is stirred, a temperature of the mixed solution is preferably from 15° C. to 35° C. A time for stirring the mixed solution is not particularly limited, but is, for example, from 700 minutes to 7000 minutes.

The first step is carried out in an inert atmosphere including an inert gas such as nitrogen ($N_2$) or argon (Ar).

The mixed solution after stirring is then filtered.

A method of filtering the mixed solution is not particularly limited, and, for example, a method such as gravitational filtration, vacuum filtration, pressure filtration, centrifugal filtration, or the like is used. Further, as a filter material, for example, a filter paper using cellulose as a base material, a membrane filter, a filter plate obtained by compression-molding cellulose, glass fiber, or the like is used. Note that a supernatant liquid may be extracted without filtration.

A solution containing a product separated from a precipitate and recovered by filtration or extraction of the supernatant liquid is naturally air-dried or dried by heating to finally produce the product alone.

This product is a sheet-shaped hydrogen storage and release material precursor having a two-dimensional network formed by boron atoms and atoms (hydrogen: H) derived from the functional group α of the ion exchange resin.

Examples of a method of analyzing the product produced by the method of producing the hydrogen storage and release material of the present embodiment include thermal desorption spectroscopy, X-ray photoelectron spectroscopy (XPS), and Fourier transform infrared spectroscopy (FT-IR).

In the thermal desorption spectroscopy, for example, in a TDS-1400TV device available from ESCO Co. Ltd., a sample is heated, and a change of an amount of gas produced over time is analyzed by an attached quadrupole mass analyzer. A calibration curve is created based on signal intensity of a sample whose hydrogen release amount is already known, and thus the quantification of the amount of gas produced, the gas production temperature, and the like can be obtained.

In X-ray photoelectron spectroscopy (XPS), for example, an X-ray photoelectron spectrometer (trade name: JPS9010TR) available from JEOL Ltd. is used to irradiate a surface of the product with X-rays and to measure energy of photoelectrons generated at that time, thus constituent elements of the product and an electronic state thereof can be analyzed. When, in this analysis, almost no photoelectron energy due to the magnesium constituting the raw material magnesium diboride is detected, and only photoelectron energy due to boron and the element derived from the functional group α of the above ion exchange resin is detected, it can be said that the product is composed only of boron and the element derived from the functional group α of the ion exchange resin described above. In a case where the element derived from the functional group α is hydrogen, detection of hydrogen by X-ray photoelectron spectroscopy is difficult, and thus hydrogen needs to be confirmed by another analysis. In a case where almost no photoelectron energy due to the magnesium constituting the raw material magnesium diboride is detected, but only photoelectron energy due to boron is detected by analysis by X-ray photoelectron spectroscopy, it can be said that the product includes boron.

In Fourier transform infrared spectroscopy (FT-IR), for example, an FT/IR-300 device available from JASCO Corporation is used to analyze the presence of oxygen functional groups or the like and absorption intensity derived from vibrations associated with the bond between boron and hydrogen.

The sheet-shaped hydrogen storage and release material precursor produced in the first step of the method of producing the hydrogen storage and release material of the present embodiment is a sheet-shaped material having a two-dimensional network containing $(HB)_n$ ($n \geq 4$) in which a molar ratio of boron to hydrogen is 1:1 (HB). That is, the sheet-shaped hydrogen storage and release material precursor is a sheet-shaped material having a two-dimensional network containing boron atoms (B) and hydrogen atoms (H), in which these two atoms are present in a molar ratio of 1:1.

In the sheet-shaped hydrogen storage and release material precursor, the ratio (molar ratio) of boron atoms (B) to hydrogen atoms (H) is determined by thermal desorption spectroscopy, and mass measurement before and after a temperature rise, which will be described later.

Also, the sheet-shaped hydrogen storage and release material precursor shows a peak derived from B1s of negatively charged boron at 188±1.0 eV in X-ray photoelectron spectroscopy.

Also, the sheet-shaped hydrogen storage and release material precursor has a spectrum showing a peak derived from an $sp^2$ structure of boron at 191 eV±1.0 eV in electron energy loss spectroscopy.

In the sheet-shaped hydrogen storage and release material precursor, electron energy loss spectroscopy will be described later.

Figure 2:
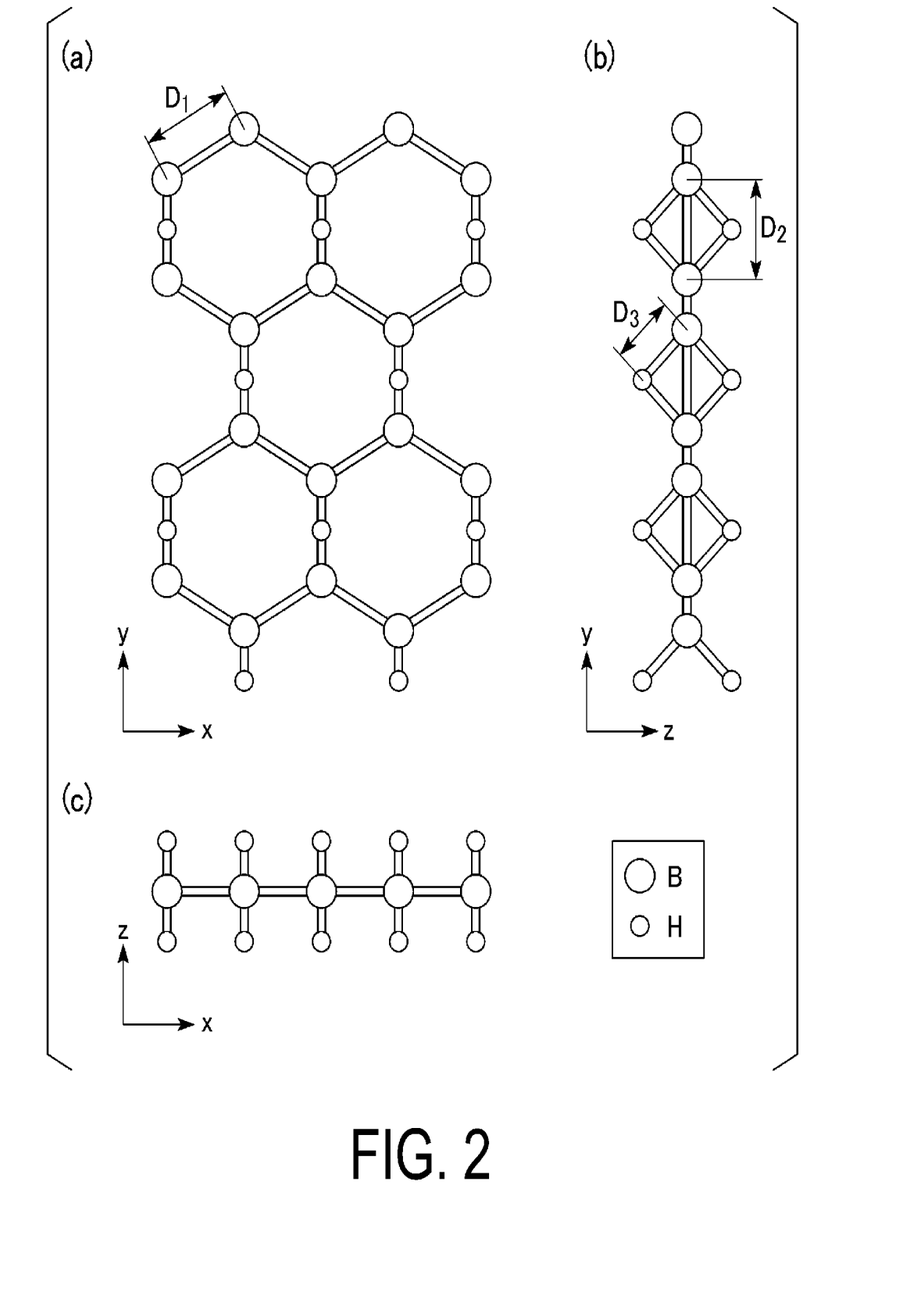
FIG. 2 is a schematic view illustrating a molecular structure of a hydrogen storage and release material precursor used in a method of producing a hydrogen storage and release material according to an embodiment of the present invention. (a) is a view illustrating an XY plane, (b) is a view illustrating a YZ plane, and (c) is a view illustrating a ZX plane.

In the sheet-shaped hydrogen storage and release material precursor, boron atoms (B) are arranged in a cyclic hexagon like a benzene ring and are present at vertices of the hexagon, and a plurality of the hexagons formed by the boron atoms (B) are connected to each other to form a mesh-shaped planar structure (two-dimensional network), as illustrated in FIG. 2. Further, the sheet-shaped hydrogen storage and release material precursor has a site where two adjacent boron atoms, among the boron atoms (B), are bonded to the same hydrogen atom (H) as illustrated in FIG. 2. In the sheet-shaped hydrogen storage and release material precursor, the hexagonal mesh shape formed by boron atoms (B) is, for example, referred to as a honeycomb shape. Furthermore, hydrogen atoms (H) are bonded to the boron atoms (B) forming the hexagons with specific periodic regularity, as illustrated in FIG. 2, or without specific periodic regularity, and are randomly bonded thereto without aggregating. Therefore, the sheet has a structure in which the bonds between the atoms are inclined, or the sheet itself bends in the z-direction of FIG. 2.

The sheet-shaped hydrogen storage and release material precursor is a thin film-shaped material having a two-dimensional network containing boron atoms (B) and hydrogen atoms (H). In addition, the sheet-shaped hydrogen storage and release material precursor hardly contains magnesium atoms derived from magnesium diboride used in the method of producing the hydrogen storage and release material of the present embodiment which will be described below, or other metal atoms.

In the sheet-shaped hydrogen storage and release material precursor, a total number of the boron atoms (B) and hydrogen atoms (H) that form the mesh-shaped planar structure is 1000 or more.

A bonding distance $D_1$ between two adjacent boron atoms (B) illustrated in FIG. 2($a$) is from 0.155 nm to 0.190 nm. A bonding distance $D_2$ between two adjacent boron atoms (B) via one hydrogen atom (H) illustrated in FIG. 2($b$) is from 0.155 nm to 0.190 nm. A bonding distance $D_3$ between an adjacent boron atom (B) and a hydrogen atom (H) illustrated in FIG. 2($b$) is from 0.12 nm to 0.15 nm.

A thickness of the sheet-shaped hydrogen storage and release material precursor is from 0.20 nm to 10.00 nm. The sheet-shaped hydrogen storage and release material precursor preferably has a length of 100 nm or more in at least one direction (e. g., a length in the X-direction or the Y-direction in FIG. 2($a$)). A size (area) of the sheet-shaped hydrogen storage and release material precursor is not particularly limited, and the sheet-shaped hydrogen storage and release material precursor can be formed in any size by the first step of the method of producing the hydrogen storage and release material of the present embodiment.

The sheet-shaped hydrogen storage and release material precursor may be terminated with an oxide, nitride, or carbide. That is, in the sheet-shaped hydrogen storage and release material precursor, an oxide, nitride, and carbide may form a terminal end of the molecular structure. Examples of oxides, nitrides and carbides forming the terminal of the molecular structure of the sheet-shaped hydrogen storage and release material precursor include boric acid ($B(OH)_3$), boron oxide ($B_2O_3$), a hydroxy group (OH), boron nitride (BN), and boron carbide (BC). The sheet-shaped hydrogen storage and release material precursor is terminated with an oxide, nitride, or carbide, thereby forming a more stable molecular structure.

The sheet-shaped hydrogen storage and release material precursor has a strong bonding force between: the boron atoms (B) forming the cyclic hexagon; and the boron atoms (B) and the hydrogen atoms (H) Therefore, even though the sheet-shaped hydrogen storage and release material precursor forms a plurality of stacked layers of aggregate at the time of production, the aggregate layers can be easily cleaved along the sheet plane, similarly to graphite, and separated (recovered) as single-layer two-dimensional sheets.

The sheet-shaped hydrogen storage and release material precursor is then heat-treated at from 120° C. to 450° C. to produce the hydrogen storage and release material of the present embodiment (second step).

In the second step, a time for heat-treating the sheet-shaped hydrogen storage and release material precursor is not particularly limited, and is, for example, from 5 minutes to 1200 minutes.

The second step is carried out under vacuum or in an inert atmosphere including an inert gas such as nitrogen ($N_2$) or argon (Ar).

According to the method of producing the hydrogen storage and release material of the present embodiment, a hydrogen storage and release material including a two-dimensional boron compound-containing sheet having a two-dimensional network containing boron atoms and atoms (hydrogen: H) derived from a functional group α of an ion exchange resin can be easily produced.

By using a large crystal of magnesium diboride having an $MgB_2$ type structure as a raw material, a sheet-shaped hydrogen storage and release material precursor having a larger area can be obtained. As a result, a sheet-shaped hydrogen storage and release material having a larger area can be obtained.

In addition, according to the method of producing the hydrogen storage and release material of the present embodiment, for ion exchange between the magnesium ions constituting the magnesium diboride and the ions of the functional group α of the ion exchange resin in the first step of forming the sheet-shaped hydrogen storage and release material precursor, an acidic solution is not used but a polar organic solvent is used. Thus, it is not necessary to adjust the pH of the mixed solution containing the polar organic solvent, the magnesium diboride, and the ion exchange resin.

EXAMPLES

Hereinafter, the present invention will be described more specifically with reference to experiment examples, but the present invention is not limited to these experiment examples.

Experiment Example 1

500 mg of magnesium diboride (purity: 99%, available from Rare Metallic Co., Ltd.) and 30 mL, by volume, of an ion exchange resin having a sulfo group (Amberlite (registered trademark) IR120B, available from Organo Corporation) were added to acetonitrile. The mixture was stirred with a glass rod to prepare a mixed solution of the magnesium diboride and the ion exchange resin.

Figure 3:
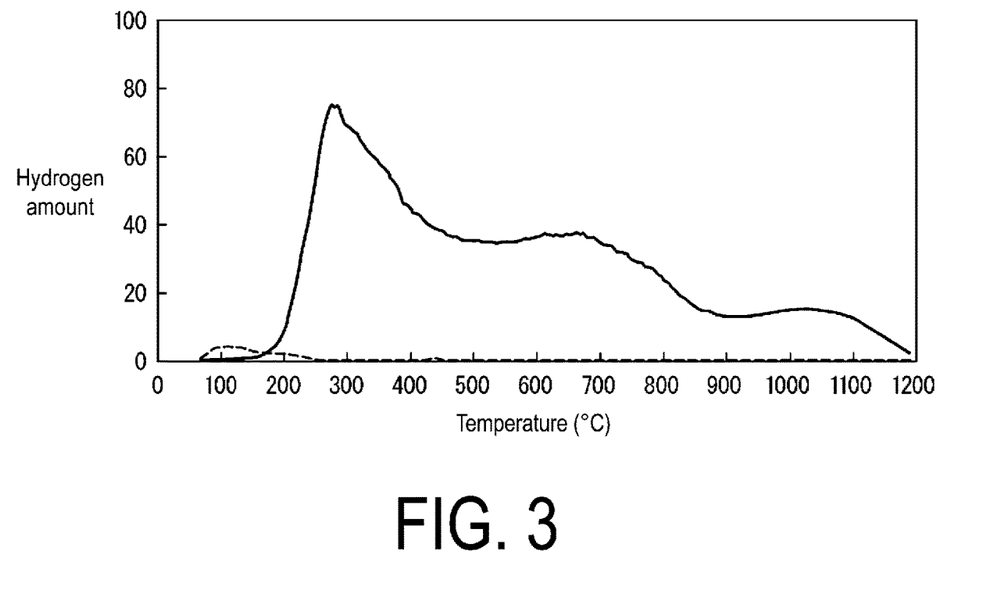
FIG. 3 is a diagram illustrating results of thermal desorption spectroscopy in Experiment Examples 1 and 2.

After stirring the mixed solution at 25° C. for 72 hours, the mixed solution was filtered through a membrane filter having a pore size of 1.0 μm, and the filtrate was recovered. Thereafter, the filtrate was dried at 90° C. using a hot plate under a nitrogen atmosphere to produce a product (hydrogen storage and release material precursor). The product was subjected to thermal desorption spectroscopy and mass measurement before and after a temperature rise to calculate a molar ratio of boron to hydrogen. A TDS-1400TV available from ESCO Co. Ltd. was used for the thermal desorption spectroscopy. An analytical balance ITX220 available from AS ONE Corporation was used for mass measurement before and after a temperature rise. The mass was measured in a vacuum type glove box (vacuum type glove box UN-800L-BG available from UNICO Ltd.). The results of the thermal desorption spectroscopy are illustrated in FIG. 3.

Experiment Example 2

A product obtained by heating the product of Experiment Example 1 (hydrogen storage and release material precursor) at 350° C. in a vacuum for 1 hour, and a product obtained by heating the product of Experiment Example 1 at 450° C. in a vacuum were obtained.

For these products, the molar ratios of boron to hydrogen were determined in the same manner as in Experiment Example 1.

The product (hydrogen storage and release material precursor) obtained in Experiment Example 1 was found to have a molar ratio of boron (B) to hydrogen (H) of 1:1. Specific determination methods were as follows. A calibration curve was created based on signal intensities of samples whose hydrogen release amounts were already known; a number of moles of hydrogen to be released was calculated using the signal intensity obtained in FIG. 3; and the molar ratio of boron to hydrogen was calculated from the sample mass measured in advance. According to the same method, the products obtained in Experiment Example 2 were found to have a molar ratio of boron (B) to hydrogen (H) of 1:0.73 in the case of heating at 350° C. and 1:0.57 in the case of heating at 450° C.

Experiment Example 3

The product (hydrogen storage and release material precursor) obtained in Experiment Example 1 was subjected to X-ray photoelectron spectroscopy using an X-ray photoelectron spectrometer (trade name: JPS9010TR) available from JEOL Ltd. The results of X-ray photoelectron spectroscopy are shown as a figure with the indication of 20° C. in FIG. 4.

Experiment Example 4

A sample obtained by heating the product (hydrogen storage and release material precursor) obtained in Experiment Example 1 at 350° C. in a vacuum for 1 hour was subjected to X-ray photoelectron spectroscopy in the same manner as in Experiment Example 3. The results of X-ray photoelectron spectroscopy are shown as a plot with the label "350° C." in FIG. 4.

Figure 4:
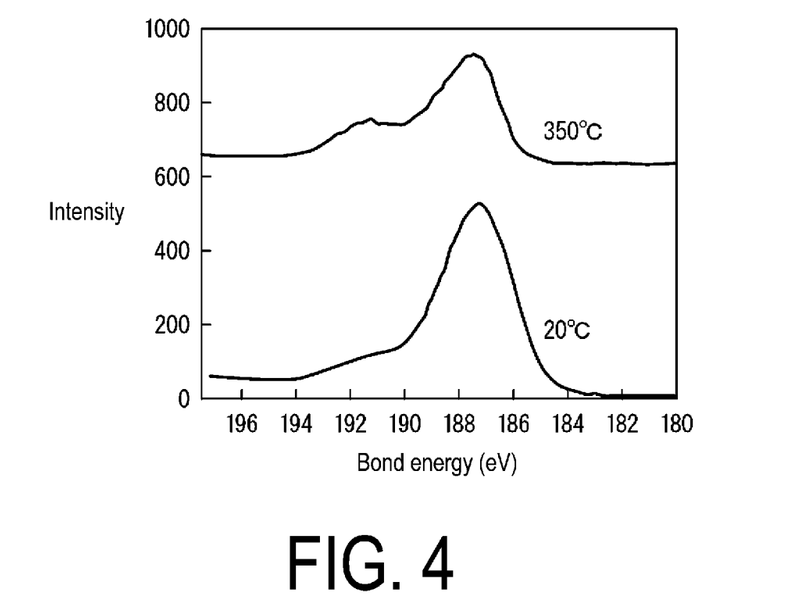
FIG. 4 is a diagram illustrating results of X-ray photoelectron spectroscopy in Experiment Examples 3 and 4.

As shown in FIG. 4, the product of Experiment Example 3 was confirmed to have a spectrum showing a peak derived from B1s of boron at 187 eV and showing no peak derived from magnesium in X-ray photoelectron spectroscopy. This result suggests that, in Experiment Example 3, ion exchange was performed between $Mg^{2+}$ ions of magnesium diboride ($MgB_2$) and hydrogen ions of the sulfo group of the ion exchange resin. Experiment Example 4 demonstrated that some of the hydrogen atoms were removed from this sample.

Experiment Example 5

The product (hydrogen storage and release material precursor) produced in the same manner as in Experiment Example 1 was heated in a vacuum to 30° C., 50° C., 100°

C., 120° C., 200° C., 250° C., 300° C., 350° C., or 400° C., and the sample held in each state was subjected to infrared spectroscopy in a vacuum.

For infrared spectroscopy, a Fourier transform infrared spectrometer (FT-IR, trade name: Alpha, available from Bruker) was used. The results of infrared spectroscopy are shown in FIG. 5.

Figure 5:
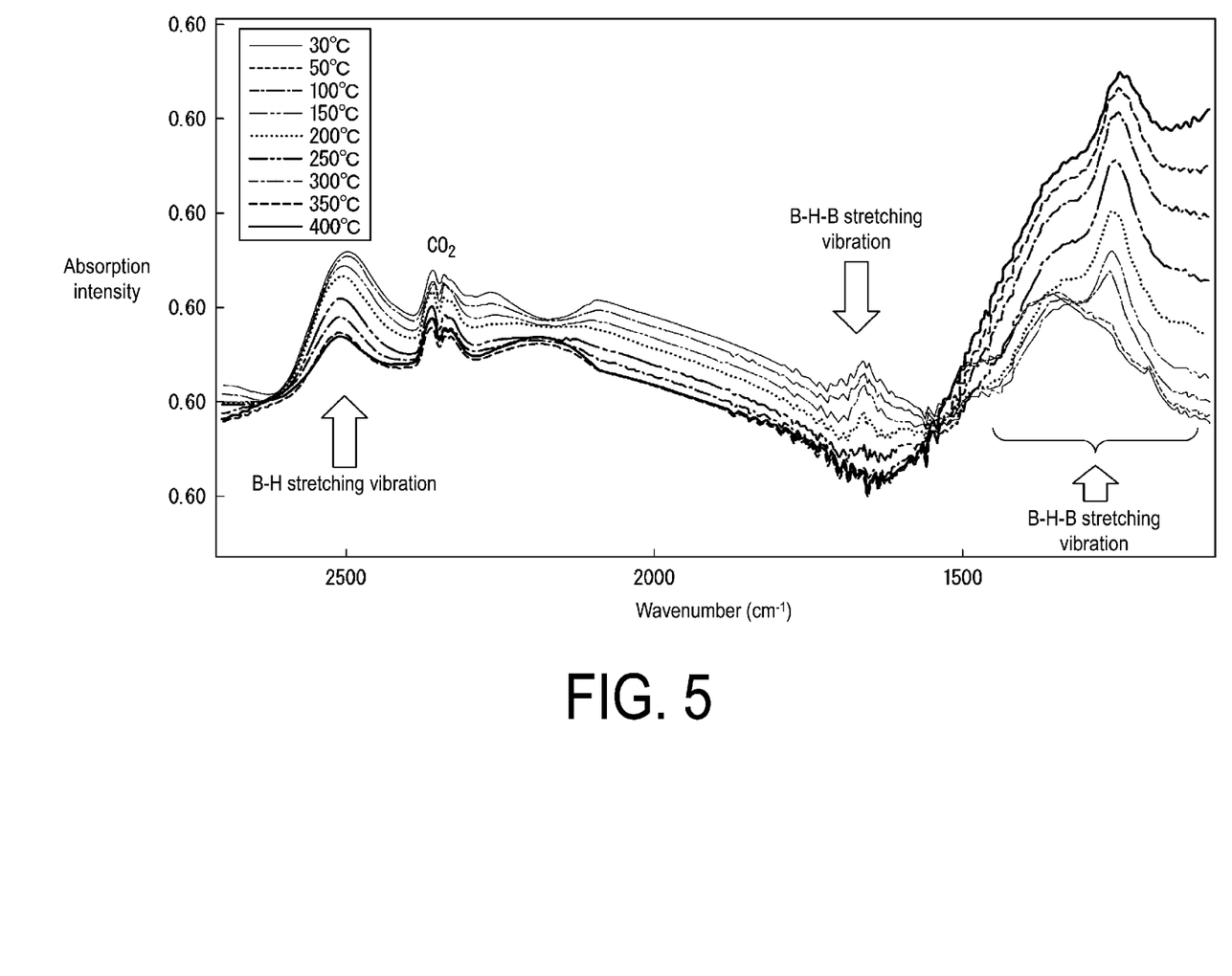
FIG. 5 is a diagram illustrating results of infrared spectroscopy in Experiment Example 5.

As shown in FIG. 5, in any of the cases, the products were confirmed to have a peak derived from B—H stretching vibration around 2500 cm', and peaks derived from B—H—B stretching vibration around 1700 cm$^{-1}$ and 1200 cm$^{-1}$ in the infrared absorption spectrum. The peak derived from B—H—B stretching vibration near 1200 cm$^{-1}$ can be confirmed up to 250° C., and it can be seen that the peak intensity is extremely low at 300° C. or higher. From the results of Experiment Examples 1 to 5, the product of Experiment Example 2 produced by heating the hydrogen storage and release material precursor to 350° C. was found to have a molar ratio of boron to hydrogen of 1:0.73, as determined by thermal desorption spectroscopy, and mass measurement before and after a temperature rise; and these products had a spectrum showing peaks derived from B1s of boron at 187 eV and 191 eV and showing no peak derived from magnesium in X-ray photoelectron spectroscopy; further, the products had a peak derived from a B—H stretching vibration at from 2400 cm$^{-1}$ to 2600 cm$^{-1}$ and also a peak derived from a B—H—B stretching vibration at from 1200 cm$^{-1}$ to 1800 cm$^{-1}$ in infrared spectroscopy. Therefore, the product of Experiment Example 2 was confirmed to be a two-dimensional hydrogen boride-containing sheet having a two-dimensional network containing $n(H_xB_y)$ ($n \geq 4$, $0.001 \leq x/y \leq 0.999$).

Experiment Example 6

An infrared heating furnace water vapor differential heat balance TG-DTA (trade name: TG-DTA/HUM-1, available from Rigaku Corporation) was used to confirm the hydrogen storage performance and hydrogen release performance of the product obtained in Experiment Example 1 in the following procedure.

First, about 10 mg of a sample (product obtained in Experiment Example 1) was weighed. This sample was hygroscopic and thus quickly collected, and an amount collected in a platinum container was used for the analysis, rather than strictly weighing 10 mg (target value).

The platinum container containing the sample was then placed in the infrared heating furnace water vapor differential heat balance TG-DTA.

The atmosphere in the instrument in which the platinum container was placed was argon with a purity of 99.99% or more, and 20 vol % of water vapor was introduced only at the time of hydrogen storage.

The temperature of the atmosphere inside the instrument was increased; the atmosphere was held at 120° C. for 30 minutes to allow the moisture adsorbed on the sample to desorb; and the mass was used as an initial mass of the sample. Thereafter, the temperature was increased; the atmosphere was held at 300° C. for 30 minutes to allow the hydrogen to desorb; and the decrease in the mass was measured. Then, the temperature was lowered to 80° C. and held for 10 minutes; 20 vol % of water vapor was introduced; the atmosphere was held for 60 minutes; the introduction of water vapor was stopped; and the atmosphere was held at 80° C. for an additional 10 minutes. Thereafter, the temperature was increased to 120° C. and held for 10 minutes, and the dry mass of the sample excluding adsorbed water was measured. The temperature was increased to 300° C. again and held for 30 minutes, and the hydrogen desorption amount was measured as a decrease from the dry mass. "300° C.→80° C.→water vapor introduction/stop→120° C." was set as one cycle, and this cycle was repeated 10 times.

Figure 6:
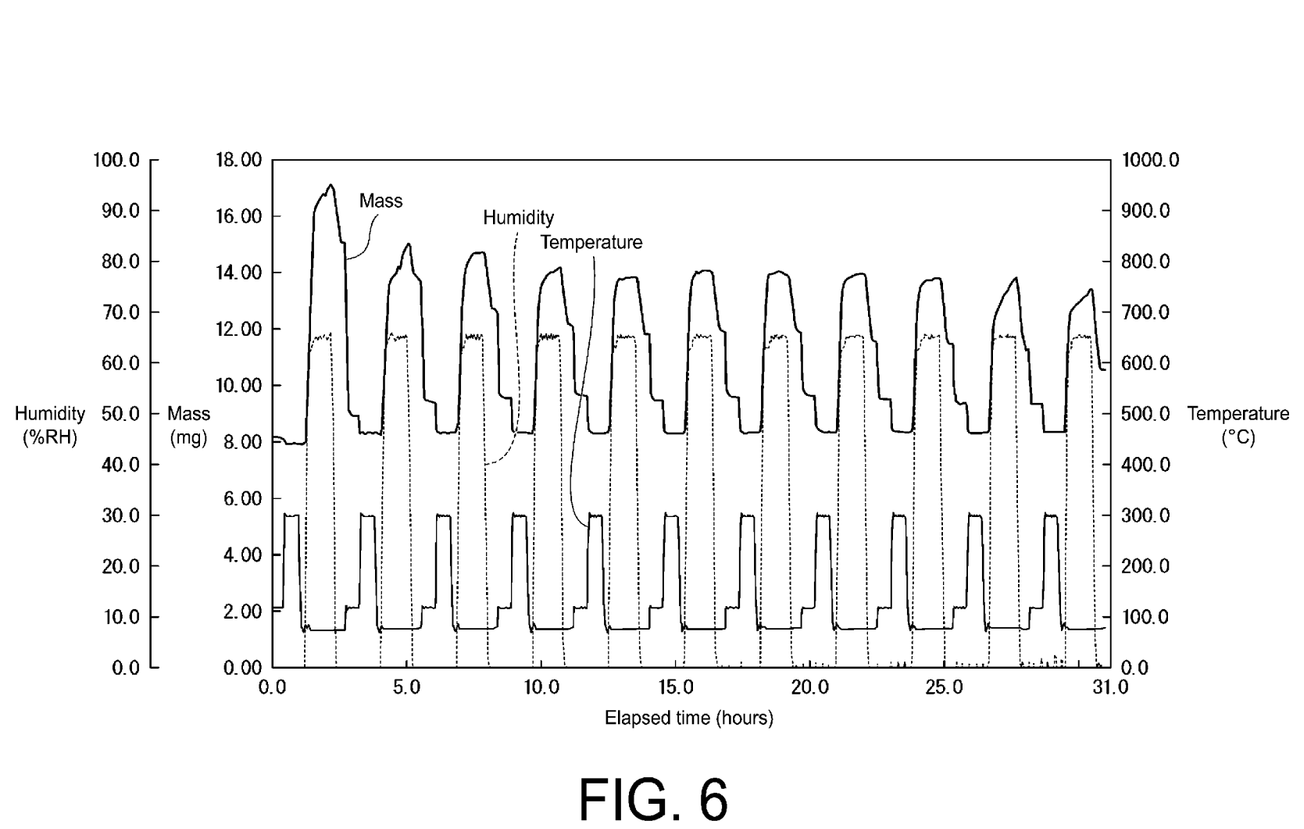
FIG. 6 is a diagram illustrating results of thermal gravity-differential thermal analysis in Experiment Example 6.

The results of the thermal gravity-differential thermal analysis are shown in FIG. 6.

From the results shown in FIG. 6, it was confirmed that the mass of the sample decreased when heated to 300° C. It is believed that the decrease in the mass of the sample was due to the release of the hydrogen from the sample upon heating to 300° C. On the other hand, it was confirmed that the mass of the sample increased upon introduction of water vapor at 80° C. It is believed that the increase in the mass of the sample was due to the adsorption and storage of the hydrogen by the sample when the sample comes into contact with water vapor in the atmosphere. The sample stores hydrogen from the water vapor in the atmosphere, and thus oxygen is produced. Also, as shown in FIG. 6, the storage and release of hydrogen by the sample can be realized repeatedly.

Here, the difference between the mass after drying of the sample and the mass of the sample after being held at 300° C. was defined as the hydrogen storage amount, and, based on the following formulas (1) and (2), a hydrogen storage amount $A_{(0)}$ (mass %) of the initial sample and a hydrogen storage amount $A_{(n)}$ (mass %) of the nth regenerated sample were calculated.

$$A_{(0)} = (W_{dry} - W_{1(0)})/W_{dry} \times 100 \quad (1)$$

$$A_{(n)} = (W_{2(n)} - W_{3(n)})/W_{dry} \times 100 \quad (2)$$

with the proviso that, in the above formulas (1) and (2), $W_{dry}$ is the mass of the sample after drying, $W_{1(0)}$ is the mass of the sample 30 minutes after hydrogen release (held at 300° C.), $W_{2(n)}$ is the mass of the sample after drying, held at 120° C. for 10 minutes after introducing water vapor at 80° C., and $W_{3(n)}$ is the mass of the sample after hydrogen release (held at 300° C.).

The results are shown in Table 1.

TABLE 1

| | Initial | 1st | 2nd | 3rd | 4th | 5th | 6th | 7th | 8th | 9th | 10th |
|---|---|---|---|---|---|---|---|---|---|---|---|
| Amount added $W_{ini}$ [mg] | 8.619 | — | — | — | — | — | — | — | — | — | — |
| Mass after drying $W_{dry}$ [mg] | 8.121 | — | — | — | — | — | — | — | — | — | — |
| Mass after regeneration (after 1 hour) $W_{1(n)}$ [mg] | — | 17.092 | 15.005 | 14.640 | 14.149 | 13.796 | 13.968 | 13.858 | 13.939 | 13.741 | 13.751 |
| Mass after dehydration $W_{2(n)}$ [mg] | — | 8.926 | 9.365 | 9.539 | 9.620 | 9.445 | 9.544 | 9.638 | 9.506 | 9.354 | 9.335 |

TABLE 1-continued

|  | Initial | 1st | 2nd | 3rd | 4th | 5th | 6th | 7th | 8th | 9th | 10th |
|---|---|---|---|---|---|---|---|---|---|---|---|
| Mass after hydrogen release $W_{3(n)}$ [mg] | 7.962 | 8.322 | 8.324 | 8.334 | 8.313 | 8.325 | 8.323 | 8.337 | 8.318 | 8.319 | 8.350 |
| Hydrogen storage amount A(n) [mass %] | 2.0 | 7.4 | 12.8 | 14.8 | 16.1 | 13.8 | 15.0 | 16.0 | 14.6 | 12.7 | 12.1 |

From the results shown in Table 1, it was found that the hydrogen storage amount increased from the initial stage to the second regeneration. Further, from the second regeneration to the ninth regeneration, the hydrogen storage amount was almost constant, although there was a variation. An average value of the hydrogen storage amounts from the second regeneration to the ninth regeneration was 14.2 mass %.

In addition, the sample after regeneration was orange. The sample after regeneration is believed to be more likely to store hydrogen.

Experiment Example 7

A gas chromatograph (trade name: TCD Gas Chromatograph GC-8A, available from Shimadzu Corporation) was used to perform gas analysis in the following procedure, and the hydrogen storage performance of the product obtained in Experiment Example 1 was confirmed.

A column (trade name: Molecular Sieve 5A, available from GL Sciences Inc., and trade name: Porapak Q, available from Waters Corporation) was used. In gas analysis using this gas chromatograph, the column temperature was 120° C., and the temperature of the injection port and detector was 140° C. The current value in a thermal conductivity detector (GC/TCD) was 60 mA. The argon carrier gas flow rate was 30 mL/min.

First, approximately 100 mg of the sample (product obtained in Experiment Example 1) was weighed and housed in a cylindrical stainless steel reaction vessel including a sealing valve provided at both ends.

The reaction vessel containing the sample was placed in a catalyst reactor, and then heat-treated under argon flow (argon flow rate: 25 mL/min) at 250° C. for 2 hours with both sealing valves open; then the temperature was lowered; and the reaction vessel was held at 90° C. for 30 minutes with both sealing valves closed. Thereafter, the gas chromatograph described above was used to perform quantitative analysis of gas (hydrogen) in the reaction vessel (step 1).

The reaction vessel was then held at 90° C. for 30 minutes under argon flow (argon flow rate: 25 mL/min) with both sealing valves open. Thereafter, 0.10 mL of water was introduced into the reaction vessel from the injection port while both sealing valves were closed, and the reaction vessel was held at 90° C. for 1 hour. Thereafter, the gas chromatograph described above was used to perform quantitative analysis of gas (oxygen) in the reaction vessel (step 2). "Step 1→step 2" was defined as 0th cycle, that is, pretreatment.

The reaction vessel was then held at 90° C. for 30 minutes under argon flow (argon flow rate: 25 mL/min) with both sealing valves open. Thereafter, the temperature was increased to 250° C. with both sealing valves closed. After the temperature rise, the reaction vessel was held at 250° C. for 30 minutes. Thereafter, the gas chromatograph described above was used to perform quantitative analysis of gas (hydrogen) in the reaction vessel (step 3).

Figure 7:
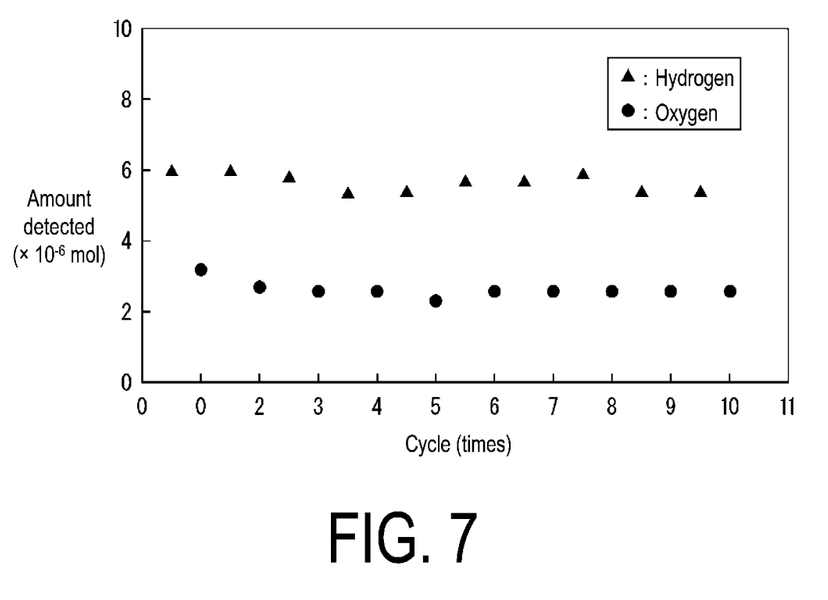
FIG. 7 is a diagram illustrating results of gas analysis in Experiment Example 7.

The "Step 3→step 2" described above was set as one cycle, this cycle was repeated 10 times, and defined as first cycle to tenth cycle. FIG. 7 shows the hydrogen gas amount measured in step 3 and the oxygen gas amount measured in step 2, in the first to tenth cycles.

As shown in FIG. 7, it was confirmed that the molar ratio of $H_2$ to $O_2$ in each cycle was close to 2:1, and the water molecules were found to be converted to hydrogen and oxygen. That is, it was confirmed that the product obtained in Experiment Example 1 repeated storage and release of hydrogen for water introduced into the reaction vessel.

INDUSTRIAL APPLICABILITY

The hydrogen storage and release material of the present invention is suitable for the generation of hydrogen and oxygen as a novel approach in producing hydrogen and oxygen from water, which is a fundamental material in the creation of a so-called "hydrogen society".

The invention claimed is:
1. A material for reversible hydrogen storage and release, the material comprising:
a two-dimensional hydrogen boride-containing sheet including a two-dimensional network containing $n(H_xB_y)$ (n≥4, 0.001≤x/y≤0.999) having a molar ratio of boron to hydrogen of from 1:0.999 to 1:0.001, the molar ratio being determined by thermal desorption spectroscopy, and mass measurement before and after temperature rise,
wherein the material for reversible hydrogen storage and release:
has peaks derived from B1s of boron at 187.5±1.0 eV and 191.2±1.0 eV to 193±1.0 eV in X-ray photoelectron spectroscopy, and
has a peak derived from a B-H stretching vibration at from 2400 $cm^{-1}$ to 2600 $cm^{-1}$ and also has a peak derived from a B-H-B stretching vibration at from 1200 $cm^{-1}$ to 1800 $cm^{-1}$ in infrared spectroscopy,
wherein
the material for reversible hydrogen storage and release reversibly stores and releases hydrogen,
the material for reversible hydrogen storage and release releases hydrogen by being heated to from 120° C. to 450° C., and
the material for reversible hydrogen storage and release that has released hydrogen, stores hydrogen by bringing the material into contact with water, and
wherein the two-dimensional hydrogen boride-containing sheet has a mesh-shaped planar structure in which:
boron atoms are arranged in a cyclic hexagon,
a plurality of the hexagons formed by the boron atoms are connected to each other, and
hydrogen atoms are randomly bonded to the boron atoms forming the plurality of the hexagons, without having specific periodic regularity and without aggregating.

2. The material for reversible hydrogen storage and release of claim 1, wherein the two-dimensional hydrogen boride-containing sheet has a length of 100 nm or more in at least one direction.

3. A method of producing the material for reversible hydrogen storage and release of claim 1, the method comprising:
   mixing, in a polar organic solvent, magnesium diboride having a $MgB_2$ structure and an ion exchange resin to which an ion that is ion-exchangeable with a magnesium ion constituting the magnesium diboride is coordinated, to form a hydrogen storage and release material precursor; and
   heat-treating the hydrogen storage and release material precursor at from 120° C. to 450° C.

4. The method of producing the material for reversible hydrogen storage and release of claim 3, wherein the hydrogen storage and release material precursor:
   includes the two-dimensional network containing $(HB)_n$ (n≥4) having a molar ratio of boron to hydrogen at 1:1, the molar ratio being determined by thermal desorption spectroscopy, and mass measurement before and after temperature rise, and
   has a spectrum showing a peak derived from B1s of negatively charged boron at 188 eV±1.0 eV in X-ray photoelectron spectroscopy, and showing a peak derived from an $sp^2$ structure of boron at 191 eV±1.0 eV in electron energy loss spectroscopy.

5. The method of producing the material for reversible hydrogen storage and release of claim 3, wherein the ion exchange resin has a sulfo group.

6. The method of producing the material for reversible hydrogen storage and release of claim 3, wherein the polar organic solvent is acetonitrile.

7. A reversible hydrogen storage and release method, comprising:
   heating a hydrogen storage and release material to from 120° C. to 450° C. to release hydrogen and bringing the hydrogen storage and release material that has released hydrogen into contact with water to store hydrogen,
   wherein the hydrogen storage and release material:
   comprises a two-dimensional hydrogen boride-containing sheet including a two-dimensional network containing $n(H_xB_y)$ (n≥4, 0.001≤x/y≤0.999) having a molar ratio of boron to hydrogen from 1:0.999 to 1:0.001, the molar ratio being determined by thermal desorption spectroscopy, and mass measurement before and after temperature rise,
   has peaks derived from B1s of boron at 187.5±1.0 eV and 191.2±1.0 eV to 193±1.0 eV in X-ray photoelectron spectroscopy, and
   has a peak derived from a B-H stretching vibration at from 2400 $cm^{-1}$ to 2600 $cm^{-1}$ and also has a peak derived from a B-H-B stretching vibration at from 1200 $cm^{-1}$ to 1800 $cm^{-1}$ in infrared spectroscopy.

\* \* \* \* \*